Oct. 23, 1928.

C. C. SPREEN 1,688,888

MECHANICAL REFRIGERATION

Filed Aug. 6, 1926   2 Sheets-Sheet 1

Charles C. Spreen
Inventor
by Smith and Freeman
Attorneys

Oct. 23, 1928.

C. C. SPREEN 1,688,888

MECHANICAL REFRIGERATION

Filed Aug. 6, 1926  2 Sheets-Sheet 2

Charles C. Spreen
Inventor
by Smith and Freeman
Attorneys

Patented Oct. 23, 1928.

1,688,888

UNITED STATES PATENT OFFICE.

CHARLES C. SPREEN, OF DETROIT, MICHIGAN, ASSIGNOR TO KELVINATOR CORPORATION, OF DETROIT, MICHIGAN, A CORPORATION OF MICHIGAN.

MECHANICAL REFRIGERATION.

Application filed August 6, 1926. Serial No. 127,532.

My invention relates to mechanical refrigeration, and particularly to means for freezing comestibles under the action of domestic mechanical refrigeration mechanism, and the principal object of my invention is to provide new and improved means of this type. In the drawings accompanying this specification and forming a part of this application I have shown, for purposes of illustration, certain forms which my invention may assume. In these drawings:

Figure 7 is a plan view showing a still further embodiment which my invention may assume, while

Figure 1:
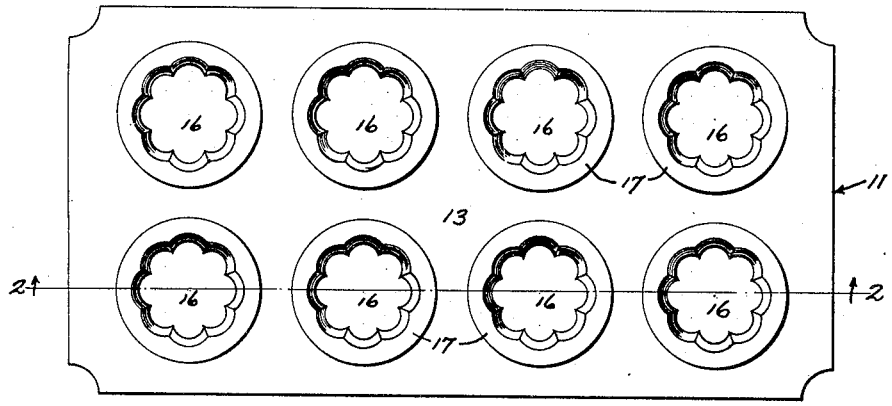
Figure 1 is a plan view of one embodiment which my invention may assume.

The embodiment of my invention shown in Figure 1 comprises a tray 11 arranged to be received and supported within the recesses customarily provided in the refrigerating apparatus of domestic mechanical refrigeration mechanism for the reception of trays for the formation of artificial ice under the action of the refrigerating apparatus, shown, for example, in Letters Patent of the United States 1,491,113 granted to me April 22, 1924, the tray 11 being provided for this purposes with depending sides 12 arranged to rest upon the bottom of the recess to support the top plate 13 of the tray 11 spaced from the bottom wall of the recess. The tray 11 herein shown is also provided with end lips 14 to facilitate removal of the tray from the recess, and the top plate 13 of the tray 11 is provided with a plurality of apertures 15 each formed to receive a mold 16 itself adapted to contain the comestible to be frozen, and provided at its upper end with a lip 17 overlying the top plate 13 of the tray 11 to support the receptacle 16 from the top plate 13.

Figure 2:
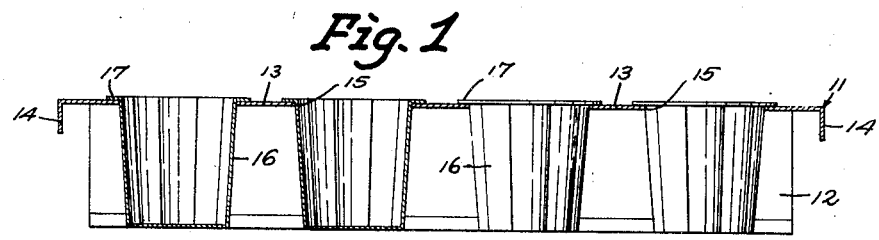
Figure 2 is a section taken on the line 2—2 of Figure 1.
Figure 3:
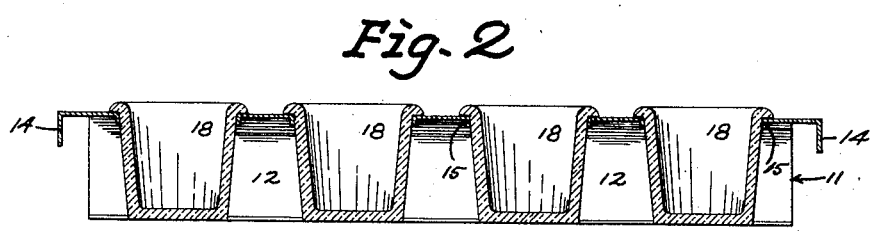
Figures 3 through 6 are sections similar to Figure 2 showing other embodiments which my invention may assume.
Figure 4:
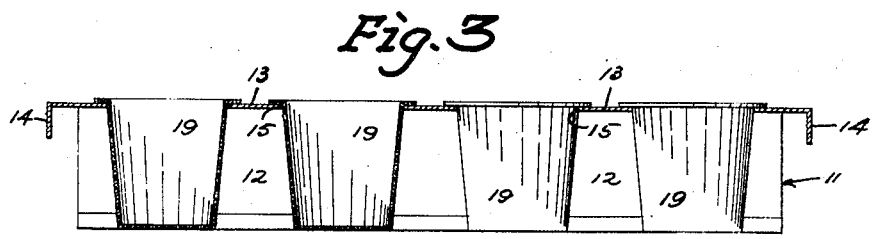

In the embodiment of my invention shown in Figures 1 and 2 I have shown molds 16 formed of metal, but under certain circumstances I prefer to employ the molds 18 shown in Figure 3 and formed of vitreous material such as glass or porcelain, and in other circumstances I prefer to employ the molds 19 shown in Figure 4 and formed from paper.

Figure 5:
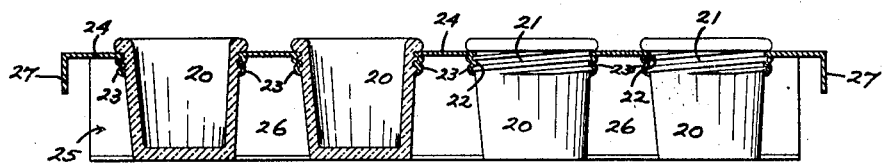

Under other circumstances I may desire to hold the molds in position within the tray, and under these circumstances I may employ the embodiment of my invention shown in Figure 5 and comprising molds 20 provided at their upper ends with screw-threads 21 arranged to coact with cooperating screw-threads 22 formed on annular projections 23 depending from the top plate 24 of a tray 25 provided again with depending sides 26 for supporting the tray 25, and with depending ends 27 for engagement to withdraw the tray 25 from the refrigerating apparatus recess.

Figure 6:
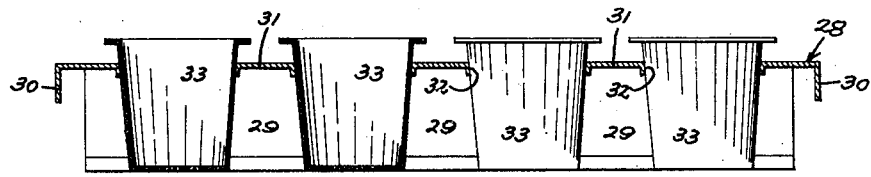

Under other circumstances I may use the embodiment of my invention shown in Figure 6 and comprising a tray 28 provided with depending sides 29 for supporting the tray 28 from the refrigerating apparatus recess, and with depending ends 30 for engagement to remove the tray from the refrigerating apparatus recess, and with a top plate 31 provided with apertures 32 for the reception of comestible-containing receptacles 33 formed tapering and of a top diameter greater than the diameter of the openings 32 whereby the molds 33 are supported directly by engagement of the side walls thereof with the walls of the openings 32 as shown clearly in Figure 6.

Figure 7:
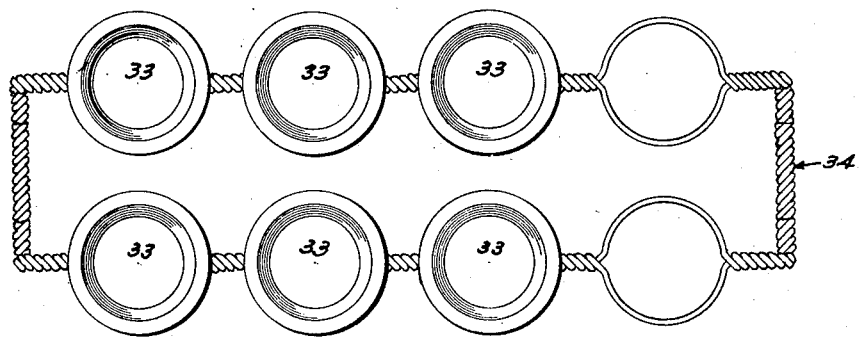
Figure 8:
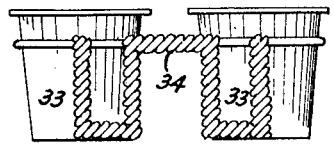
Figure 8 is an end view of the embodiment of my invention shown in Figure 7.

Under certain circumstances I may substitute for the tray 28 of Figure 6 the tray 34 shown in Figures 7 and 8 and formed of twisted wire as shown.

While I have shown the molds 16 of Figures 1 and 2 as formed of metal, and the molds 18 and 20 of Figures 3 and 5 as formed of vitreous material, and the molds 19 and 33 of Figures 4 and 6 through 8 as formed of paper, and the molds 16 of Figures 1 and 2 as fancy, and the molds 18 and 19 and 20 and 33 of Figures 3 through 8 as plain, it will be obvious to those skilled in the art that any of the molds may be formed of any desired material, either metal or vitreous material or paper, and that the vitreous material may be any desired vitreous material, and particularly glass or porcelain, and that any of the molds may be formed either fancy or plain, and of any desired size or configuration, and in any desired design.

At the same time it will also be obvious to those skilled in the art that the various embodiments of my invention herein shown provide new and improved means for freezing comestibles under the action of the refrigerating apparatus of domestic mechanical refrigeration mechanism, and for freezing these comestibles in the form of individual portions, and either in metal molds from which the frozen comestible may be removed before serving, or in vitreous or paper molds in which the frozen comestible may be properly served.

It will of course be understood that the term "comestible" includes any material to be frozen, and that the word "frozen" includes either freezing or congealing or cooling.

From the above disclosure, then, it will be obvious to those skilled in the art that I have provided new and improved means for freezing comestibles under the action of the refrigerating apparatus of domestic mechanical refrigeration mechanism. At the same time it will also be obvious to those skilled in the art that the various embodiments of my invention herein shown and described may all be variously changed and modified without departing from the spirit of my invention or sacrificing the advantages thereof, and it will therefore be understood that the disclosure herein is illustrative only, and that my invention is not limited thereto.

I claim:

1. A tray for freezing comestibles in a mechanical refrigeration system comprising a supporting rack provided with a plurality of openings, molds adapted to be removably secured in the openings of said rack, depending flange means associated with said rack adjacent the openings to retain said molds on said rack, and means intermediate the ends of said molds to cooperate with said flange means to retain said molds in said rack.

2. A tray for freezing comestibles in a mechanical refrigeration system comprising a supporting rack provided with a plurality of circular openings, molds adapted to be removably secured in the openings of said rack, screw threads formed on the depending walls of the openings, and screw threads intermediate the ends of said molds cooperating with said screw threads on the opening walls of said rack to retain said molds in fixed relation to said rack.

In testimony whereof I hereunto affix my signature.

CHARLES C. SPREEN.